Sept. 8, 1925.
A. G. MILLS
END GATE
Filed Dec. 19, 1922
1,552,492
Fig.1.
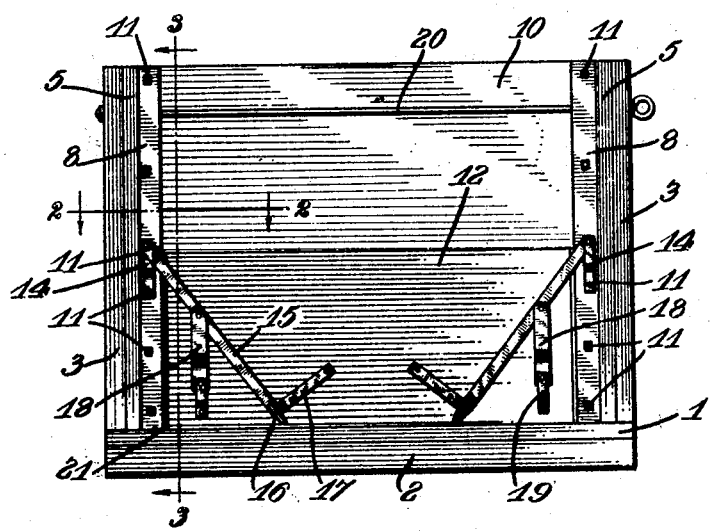
Fig.3.
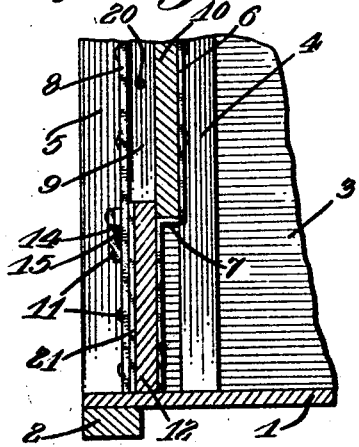
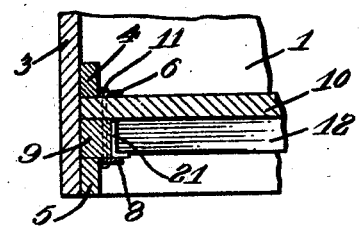
Fig.2.
A. G. Mills,
Inventor
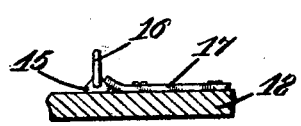
Fig.4.
By C. A. Snow & Co.
Attorney Patented Sept. 8, 1925.

1,552,492

UNITED STATES PATENT OFFICE.

ARTHUR G. MILLS, OF SIOUX RAPIDS, IOWA, ASSIGNOR TO MINNIE E. MILLS, OF SIOUX RAPIDS, IOWA.

END GATE.

Application filed December 19, 1922. Serial No. 607,833.

*To all whom it may concern:*

Be it known that I, ARTHUR G. MILLS, a citizen of the United States, residing at Sioux Rapids, in the county of Buena Vista and State of Iowa, have invented a new and useful End Gate, of which the following is a specification.

The device forming the subject matter of this application is an endgate for wagons and one object of the invention is to provide means for mounting the end gate on a wagon box. Another object of the invention is to provide novel means for raising the lower portion of the end gate, thereby to adjust the space through which the grain or other material in the wagon box is adapted to flow.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in elevation, a device constructed in accordance with the invention; Figure 2 is a section on the line 2—2 of Figure 1; Figure 3 is a section on the line 3—3 of Figure 1; Figure 4 is a fragmental section disclosing one of the keepers.

In the accompanying drawings the numeral 1 marks the bottom of a wagon box, supported by a sill 2. The sides of the wagon box are denoted by the numeral 3. Each side 3 carries a forward cleat 4 and a rear cleat 5. The ends of an upper gate section 10 are received between the cleats 4 and 5 and abut against the cleats 4. The space between the gate section 10 and the rear cleats 5 is occupied by fillers 9 which extend downwardly to the bottom 1. Forward guides 6 cooperate with the forward surface of the upper gate section 10 and are located in abutment with the forward cleats 4. The forward guides 6 may be offset forwardly, as shown at 7 so as to extend beneath the gate section 10 and support the same. Rear guides 8 cooperate with the fillers 9 and abut at their edges against the rear cleats 5. Through the guides 8 and 6 and through the fillers 9 extend securing elements 11.

A lower gate section 12 is overlapped at its upper edge on the upper gate section 10. The lower gate section 12 may be bound at its edges, for reinforcement, by angle members 21. The ends of the gate section 12 are received slidably in the spaces formed by the parts 8, 9 and 6, as shown in Figure 3. Because the forward guides are offset as at 7 in Figure 3, the lower ends of the said guides coact with the lower gate section 12 to hold the same for vertical sliding movement. The sides 3 of the wagon box may be connected by a bolt 20 or the like, the same passing through the fillers 9 and aiding to hold the upper gate section 10 and parts associated therewith in position.

Brackets 14 are held by certain of the securing elements 11 on the rear guides 8. On one of the securing elements 11 is fulcrumed a lever 15, there being a lever at each end of the end gate as shown in Figure 1. The levers 15 have handles 16 adapted to cooperate with keepers 17 on the vertically slidable lower end gate section 12. Links 18 are pivoted at their lower end to brackets 19 on the lower gate section 12, the upper ends of the links being pivoted to the levers 15 intermediate the ends of the levers.

When the levers 15 are detached from the keepers 17, the inner ends of the levers may be swung upwardly, raising the lower gate section 12 to any desired extent, the connection between the links 18 and the brackets 19, and between the links and the levers, permitting the links to swing when the inner ends of the levers 15 are moved upwardly or downwardly. The ends of the lower gate section 12 slide in contact with the fillers 9, and behind the rear guides 8, in a manner which will be understood readily when the drawings are examined.

The device is simple in construction and affords an adequate means whereby the operator may raise the lower gate section 12 much or little, depending upon the rapidity with which the contents of the wagon body is to be discharged. When the lower gate section 12 is in the lowered position shown in Figure 1, and when the levers 15 are engaged with the keepers 17, the lower gate section will be locked in a closed position.

What is claimed is:—

1. The combination with the sides of a wagon box, of forward and rear cleats on the sides, an upper gate section disposed between the forward and rear cleats and abutting against the forward cleats, fillers occupying the space between the upper gate section and the rear cleats, forward guides cooperating at their upper ends with the forward surface of the upper gate section and offset intermediate their ends to extend beneath and support the upper gate section, rear guides overlapped on the fillers, a lower gate section slidable in grooves formed by the rear guides, the fillers and the lower ends of the forward guides, and securing devices connecting the forward and rear guides with the fillers.

2. An end gate embodying a fixed upper section, a vertically slidable lower section, downwardly and inwardly inclined levers mounted to swing parallel to said sections, fulcra for the upper ends of the levers, depending links pivotally connected at their upper ends with the intermediate portions of the levers, the lower ends of the links being pivotally connected with the lower gate section, and keepers on the lower gate section, the keepers cooperating with the levers to hold the lower gate section closed.

In testimony that I claim the foregoing as my own, I have hereto affixed my signature.

ARTHUR G. MILLS.